No. 736,415. Patented August 18, 1903.

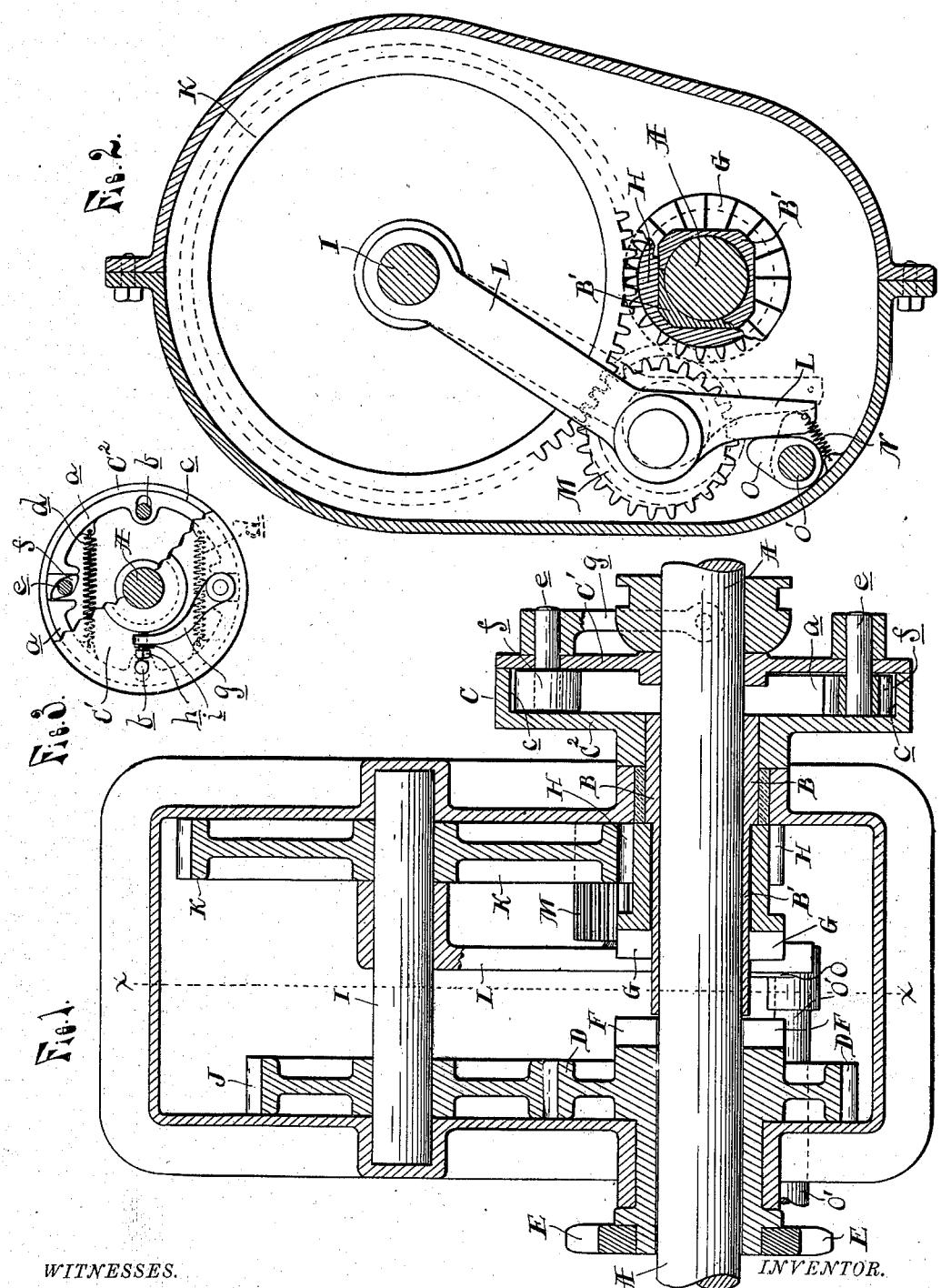

UNITED STATES PATENT OFFICE.

WALTER L. MARR, OF DETROIT, MICHIGAN.

CHANGEABLE-SPEED GEAR.

SPECIFICATION forming part of Letters Patent No. 736,415, dated August 18, 1903.

Application filed February 19, 1903. Serial No. 144,064. (No model.)

*To all whom it may concern:*

Be it known that I, WALTER L. MARR, a citizen of the United States of America, residing at Detroit, in the county of Wayne and State of Michigan, have invented certain new and useful Improvements in Changeable-Speed Gear, of which the following is a specification, reference being had therein to the accompanying drawings.

This invention relates to new and useful improvements in changeable-speed gears, and refers more particularly to transmission-gears designed for use in connection with automobiles, &c., and has for its object to make a gear which shall be simple, compact, and not liable to get out of order and which shall have two speeds ahead and a reverse with the least possible number of gears and parts.

To this end the invention consists in the peculiar construction, arrangement, and combination of parts, all as more fully hereinafter described, and shown in the accompanying drawings, in which—

Figure 1 is a vertical central longitudinal section through the gear and casing, showing the parts in position for driving slow speed ahead; Fig. 2, a section on the line $x\ x$, Fig. 1, looking to the right, showing the parts in dotted lines for driving in the reverse direction; Fig. 3, an end elevation of the friction-clutch, partly in section.

In the drawings, A is the engine-shaft; B, a sleeve loose on the shaft having a reduced squared portion B', and C a two-part friction-clutch, which may be of any well-known type, one half of which clutch is keyed to the sleeve B and the other half to the shaft A, so that when the two parts are brought together by means of any suitable lever mechanism it will have the effect of causing the shaft A and sleeve B to revolve together.

The clutch which I have shown in the drawings is of the type known as an "expanding" clutch and consists of the male and female members C' C², secured to the shaft A and sleeve B, respectively, the member C' carrying the two semicircular friction-shoes $a$, loosely mounted on the pins $b$, said shoes being normally held out of contact with the internal friction-face $c$ of the member C² by coil-springs $d$, connected at their opposite ends to said shoes.

$e$ represents rock-shafts journaled in the member C' near its outer edge at diametrically opposite points and provided at their inner ends with cams $f$, interposed between the adjacent ends of said shoes, and $g$ represents rock-arms carried by the outer end of said shafts adapted to coöperate with a sliding cone on the engine-shaft to spread said arms apart and cause the friction-shoes to set against the friction-face of the clutch member C², a suitable hand-lever being provided for sliding said cone in or out, and suitable contacts or adjusting-screws $h$ are carried by the inner ends of the rock-arms for taking up the wear of the parts, a lock-nut $i$ being provided for holding them in their adjusted position.

D is a gear sleeved on the shaft independent of the sleeve B and provided with a flanged hub carrying the drive-sprocket E, adapted to be connected by means of a sprocket-chain with the drive-sprocket on the rear axle of an automobile.

F represents ratchet-teeth, preferably formed integral with the gear D, and G represents similar teeth formed integral with a gear or pinion H, loosely sleeved on the squared portion B' of the tubular sleeve B, so that when said teeth are moved into engagement with the teeth F it will form a positive clutch with the gear D and drive the sprocket direct, a suitable lever mechanism (not shown) being provided for moving said clutch member G and pinion H longitudinally on the sleeve. In this position of the parts the automobile would be driven full speed ahead.

I is a transverse shaft journaled in suitable bearings in the upper part of the casing and carrying two gears J K, fast thereon, adapted to mesh with the gear D and pinion H, respectively, and L is an arm loose on said shaft and carrying an idle or intermediate pinion M at its lower end adapted to ride on the gear K and of a width twice that of the pinion H, so that as the pinion H is moved longitudinally on the shaft it will still be in mesh with said pinion M when in its lowered position.

N is a suitable spring for normally holding said pinion out of contact with the pinion H, the pinion M, however, always riding on the gear K whether idle or in mesh with the pinion H.

O is a cam mounted upon a shaft O', journaled in the casing for throwing said pinion M in mesh with the pinion H in reversing.

All the parts are so arranged and connected with suitable interlocking mechanism that before one can be thrown into engagement all the others must be thrown out, thereby avoiding all danger of stripping the gears.

The gears K H are of the proportion of two to one, while the gears J D are both of the same size.

Having thus fully described the invention, it is intended to operate as follows: For full speed ahead the part G is thrown into engagement with the part F and the friction-clutch C thrown in, when the parts will be practically integral and driven from shaft A through clutch C, sleeve B, parts G F D, and sprocket E to rear axle. For slow speed ahead the pinion H is slid into mesh with the gear K and clutch C thrown in, when the parts will be driven through shaft A, clutch C, gears H K, shaft I, gears J D, and sprocket E to rear axle. For slow speed in the reverse direction or back up pinion H is moved longitudinally to disengage gear K, but not far enough for parts F G to touch. Intermediate pinion M is then thrown in mesh with pinion H and clutch C thrown in, when the parts will be driven in the reverse direction through the medium of intermediate pinion M—that is, from pinion H to M to K, shaft I, gears J D, and sprocket E to rear axle. By having the engine-shaft and counter-shaft mounted in the same casing the alinement of all gears is assured, which casing can then be readily secured to the motor-frame.

With my construction I use but five gears for two speeds ahead and a reverse, and as there are no heavy parts to move in changing from one speed to another all danger of stripping the gears is avoided, and by reason of the squared sleeve I am enabled to do away with all keys, ways, &c.

Having thus fully described my invention, what I claim is—

1. In a changeable-speed gear, the combination with a casing, a main shaft journaled in said casing, gears loosely mounted on said shaft, a sleeve having a squared portion interposed between one of said gears and shaft, a sprocket-wheel carried by the other gear, teeth formed on the adjacent ends of said gears, a two-part friction-clutch carried by said sleeve and shaft respectively, a counter-shaft journaled in the frame, gears on said shaft adapted to mesh with the aforementioned gears, an arm loose on said shaft and a pinion carried by said arm riding on one of said gears and adapted to be thrown in mesh with the corresponding gear on the other shaft.

2. In a changeable-speed gear, the combination with a frame, a main driven shaft journaled in said frame, two differential gear-wheels loosely mounted on said main shaft, a sleeve having a squared portion interposed between one of said gears and the shaft, a sprocket-wheel carried by the other gear and clutch-teeth formed on the adjacent ends of said gears, a two-part friction-clutch carried by said sleeve and shaft respectively, differential gear-wheels journaled in said frame and meshing with the gear-wheels on the main shaft, an intermediate pinion riding on one of said gears and adapted to be thrown into mesh with one of the gears on the main shaft, said gear on the sleeve being free to slide into engagement with the gear on the main shaft.

3. In a changeable-speed gear, the combination with a frame or casing, of an engine-shaft and a counter-shaft journaled in the casing, two pairs of differential gear-wheels mounted on said shafts, a sleeve having a squared portion interposed between one of said gears and the engine-shaft, a two-part clutch mounted on said sleeve and shaft respectively, a sprocket carried by the other gear on the engine-shaft, said gear being loose on the shaft, clutch-teeth formed on the adjacent ends of said last-mentioned gears, said gear on the sleeve being free to move into engagement with the loose gear on the shaft and an intermediate pinion riding on one of said gears on the counter-shaft and adapted to be thrown into mesh with the gear on the sleeve.

4. In a changeable-speed gearing, the combination of a driving-shaft, a sleeve loose on said shaft and having a squared portion, a two-part clutch, one part of which is secured to the sleeve and the other part secured to the shaft, a pinion mounted on the squared portion of the sleeve to move longitudinally thereon, a gear loosely mounted on said shaft adjacent to the end of said sleeve, a sprocket-wheel secured to said gear, teeth on the hub of said gear and teeth on the hub of the pinion adapted to engage said teeth on the gear, a casing, and gears mounted in the casing for transmitting motion from the said pinion to said gear when the pinion is moved to disengage its teeth from the teeth on the gear.

5. In a changeable-speed gearing, the combination of a driving-shaft, a sleeve loose on said shaft, a two-part clutch one part of which is secured to the sleeve and the other part to the shaft, a gear or pinion mounted on said sleeve to turn therewith, clutch-teeth on said pinion, a gear loosely mounted on the shaft and having an elongated hub, a sprocket-wheel secured to one end of the hub and clutch-teeth formed on the opposite end thereof, a casing provided with a bearing for the hub of said gear at one side and with a bearing for the sleeve at its opposite side, a counter-shaft mounted in bearings in the casing and extending parallel with the drive-shaft, gears on the counter-shaft in engagement with the gears on the driving-shaft and an intermediate pinion carried by the counter-shaft adapted to engage said pinion.

6. In a changeable-speed gearing, the combination of a driving-shaft, a casing through which the shaft extends, a gear loose on said shaft, a pinion movable longitudinally of the shaft, a counter-shaft mounted in bearings in the casing parallel with the driving-shaft, gears of different diameters engaging the gear and adapted to engage the pinion and mounted on the counter-shaft, an arm journaled on the counter-shaft, an intermediate pinion journaled on the end of said arm in mesh with the large gear on the counter-shaft, said pinion having a wide face adapted to be engaged by the pinion on the driving-shaft when the same is moved longitudinally thereon out of engagement with the large gear, and means for turning said arm on its shaft to bring its pinion into position to be engaged by said pinion on the drive-shaft.

7. In a changeable-speed gearing, the combination of a driving-shaft, a gear loosely mounted on said shaft, a sprocket-wheel secured to the hub of said gear at one end and teeth formed on the hub at the other end, a pinion secured to the shaft to move longitudinally thereof and provided with teeth to engage the teeth on the gear and drive at fast speed ahead; a casing, a counter-shaft mounted in bearings on the casing, a gear on said counter-shaft in engagement with the gear on the driving-shaft and a large gear on the same shaft adapted to be engaged by the pinion on the driving-shaft when said pinion is moved on the shaft away from the gear thereon, to drive at slow speed ahead; an arm loosely mounted on the counter-shaft, an intermediate pinion journaled on the end of said arm in mesh with the large gear and having a face wider than that of said gear, and means for moving said pinion into engagement with the pinion on the driving-shaft when said last-named pinion is out of engagement with both the large gear and the teeth of the gear on the driving-shaft, to drive in a reverse direction at slow speed; and means for holding said pinion on the arm from engaging the pinion on the shaft so that said shaft and its pinion may turn without actuating the other parts.

8. In a changeable-speed gearing, the combination of a driving-shaft, a sleeve on said shaft having a squared portion, a pinion on said squared portion, teeth on the hub of said pinion, a gear loosely mounted on said shaft, a sprocket-wheel secured to the hub of said gear at one end, teeth on the opposite end of the hub of said gear, a casing, a counter-shaft mounted in bearings in said casing, a gear on said counter-shaft in mesh with the gear on the driving-shaft, a large gear on said counter-shaft with which the pinion on the driving-shaft is adapted to engage, an arm loosely mounted to turn on the counter-shaft, an intermediate pinion journaled on said arm and having a face of greater width than that of the large gear, a rock-shaft journaled in the casing, a cam on said rock-shaft to engage said arm and move the same in one direction, and a spring to move the arm in the other direction.

In testimony whereof I affix my signature in presence of two witnesses.

WALTER L. MARR.

Witnesses:
  OTTO F. BARTHEL,
  LEWIS E. FLANDERS.